Patented May 1, 1923.

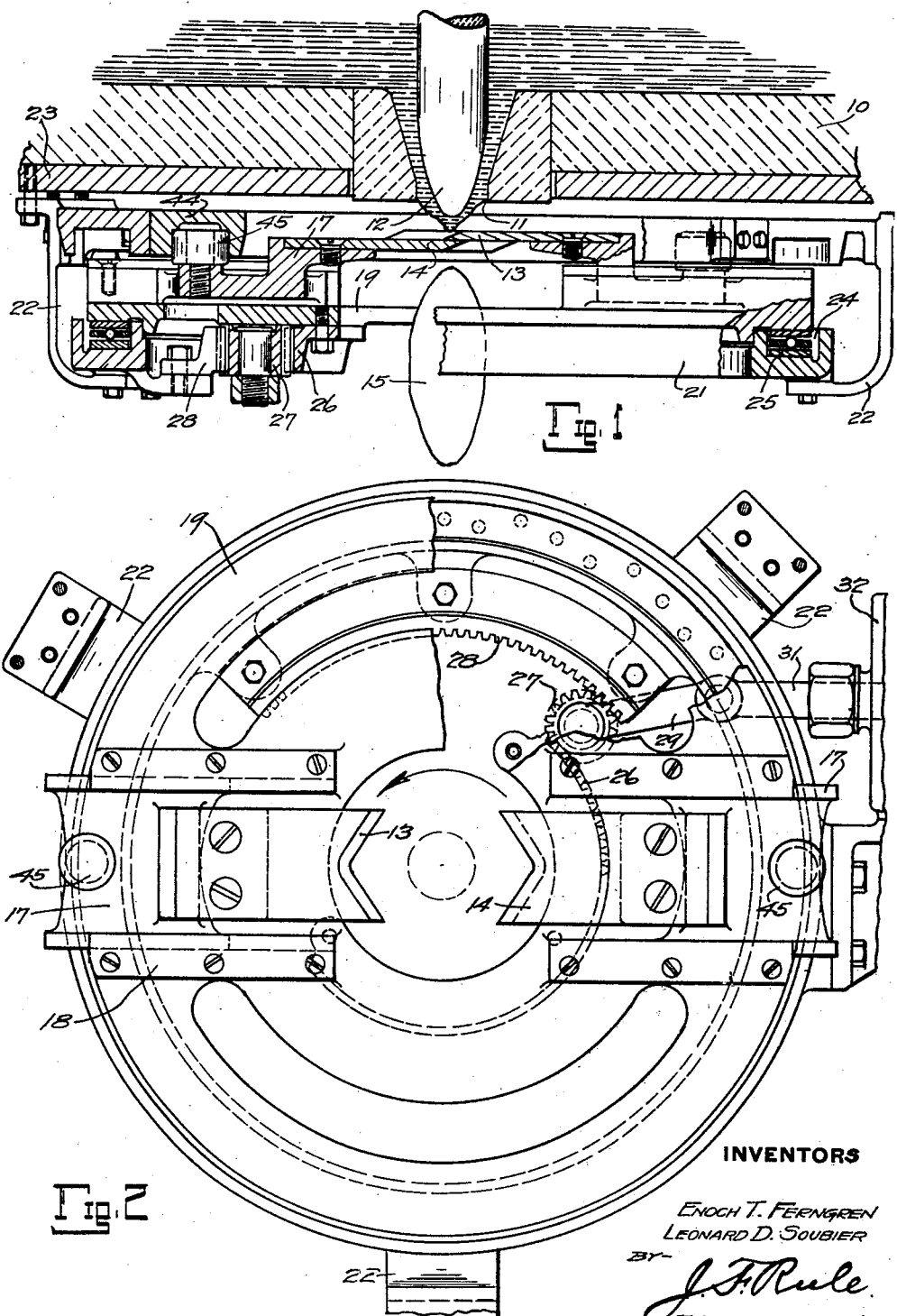

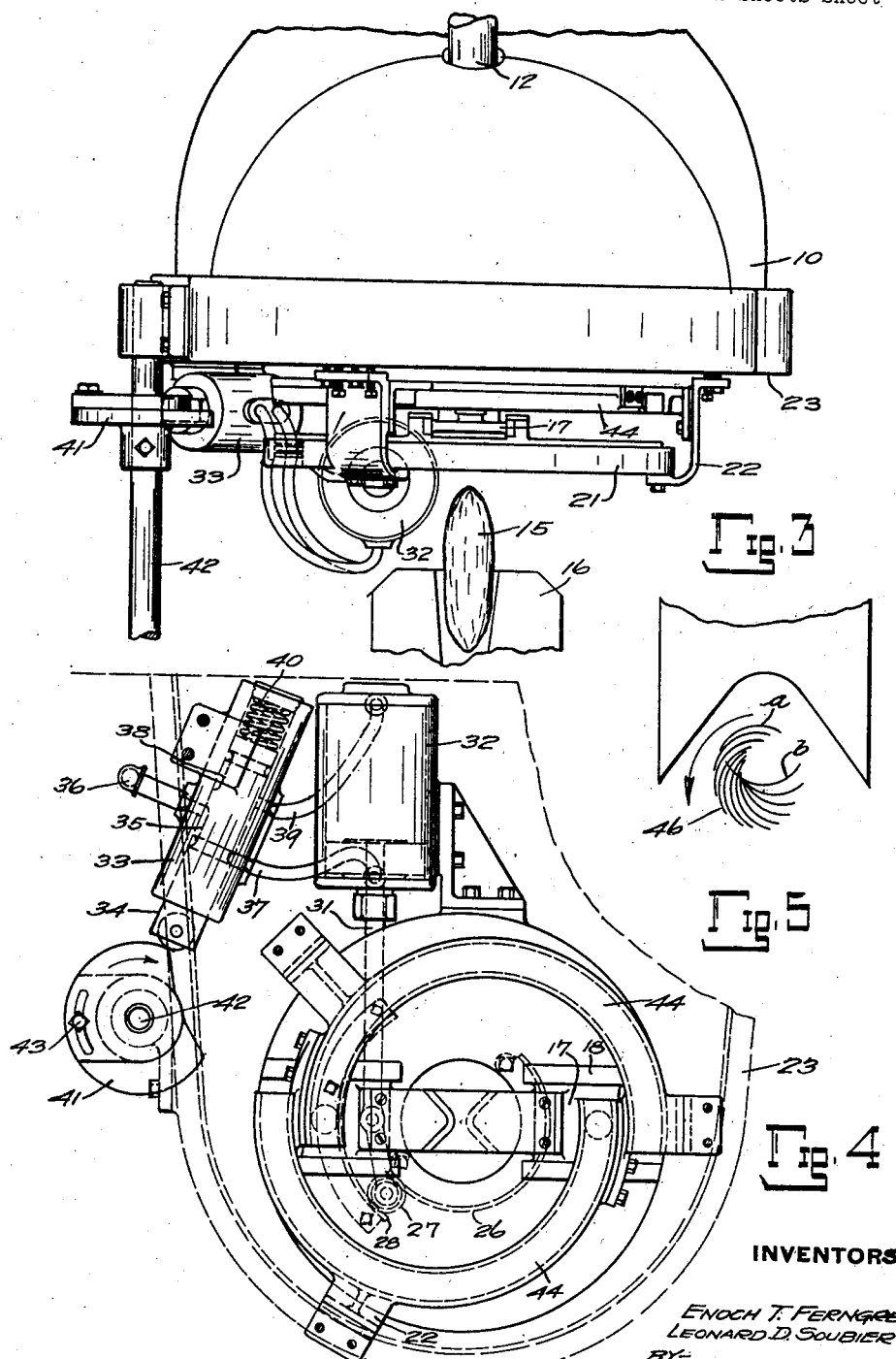

1,453,315

UNITED STATES PATENT OFFICE.

ENOCH T. FERNGREN AND LEONARD D. SOUBIER, OF TOLEDO, OHIO, ASSIGNORS TO THE OWENS BOTTLE COMPANY, OF TOLEDO, OHIO, A CORPORATION OF OHIO.

GLASS-CUTTING MECHANISM.

Application filed September 9, 1921. Serial No. 499,404.

*To all whom it may concern:*

Be it known that we, ENOCH T. FERNGREN, a citizen of Sweden, residing at Toledo, in the county of Lucas and State of Ohio, and LEONARD D. SOUBIER, a citizen of the United States, residing at Toledo, in the county of Lucas and State of Ohio, have invented new and useful Improvements in Glass-Cutting Mechanism, of which the following is a specification.

Our invention relates to cutting apparatus which, as herein shown, is particularly designed and adapted for severing individual masses or gobs of molten or plastic glass from a supply as it issues from an outlet in the bottom of a receptacle. Cutters in general use for this purpose ordinarily comprise a pair of shears or cutter blades which advance from opposite directions to an overlapping position and thereby sever the glass. Such cutters have a tendency to flatten or spread the glass at the plane of severance in a direction transverse to the movement of the cutters. There is also a tendency of the lower blade to push the severed end of the gob in the direction in which the blade advances, the stub of glass above the cutters being pushed at the same time in the opposite direction by the upper oppositely moving blade. The issuing column of glass as well as the severed gob are thus displaced or thrown out of their normal vertical line of movement. This results in a banana-like twist being imparted to the gobs. Moreover, with the usual cutters there is an unequal penetration of the blades at different sides of the issuing glass, causing an uneven chilling and a lack of uniformity of surface tension of the cut surface, resulting in corresponding defects in the finished ware.

An object of our invention is to overcome the above objections and to provide a practical form of cutting apparatus which will sever the glass without deforming or displacing it. For this purpose we provide a pair of cutter blades which approach the issuing stream or column of glass from opposite directions and which during their cutting movement are rotated in a horizontal plane, whereby the cutting edges move spirally into the glass. The movement of the blades may be such that each blade is rotated through substantially 180 degrees while severing the glass, so that at the completion of the cut it is moving in the opposite direction from that in which it was moving at the commencement of the cut. This movement of the cutter blades prevents deformation and displacement of the glass and results in a smooth, symmetrical cut surface.

Other objects of the invention will appear hereinafter.

In the accompanying drawings:

Figure 1 is a sectional elevation of cutting apparatus constructed in accordance with our invention, and also shows a furnace boot to which it is attached.

Figure 2 is a top plan view of a portion of the apparatus.

Figure 3 is an elevation of the apparatus and the furnace boot.

Figure 4 is a plan view of the apparatus.

Figure 5 is a diagrammatic view illustrating the spiral movement of a cutter.

Molten glass is supplied from a furnace boot or extension 10 having an outlet opening 11 in the bottom thereof through which the glass issues. The flow of glass may be regulated and controlled in a well known manner by a vertically reciprocating clay plug 12 which, in co-operation with a pair of cutter blades 13 and 14, operates to form individual masses or gobs 15 which drop into or are conveyed to molds 16 of a glass forming machine. The blades are mounted on blocks 17 which reciprocate in slideways 18 provided on a circular plate 19. The plate 19 is mounted to rotate on a stationary base plate 21 carried on brackets 22 attached to the frame-work 23 which supports the floor of the boot 10. The base 21 is provided with a raceway 24 to receive ball bearings 25 on which the plate 19 runs.

A segmental rack 26 attached to the plate 19 runs in mesh with a pinion 27 with which also meshes a stationary rack 28 attached to the base 21. The pinion 27 is carried by an arm 29 pivotally connected to a piston rod 31 of an air motor 32. When the piston 31 moves forward, the pinion 27 driven thereby rolls along the rack 28 and advances the rack 26. Owing to the rotation of the pinion on its axis as it advances along the rack 28 and the fact that the rack 26 is nearer its center of rotation than the rack 28, the rack 26 is driven at more than double the angular velocity at which the pinion is moved around the center of the plate 19. The supply of air to the motor 32 is controlled by a valve 33. The reciprocating valve stem 34 is provided with a port 35 which, when in the Figure 4 position, is open to an air pressure pipe 36 and establishes communication from said pipe to a pipe 37 leading to one end of the air motor. When the valve stem 34 moves outward, the port 35 is closed and a port 38 opened to the pipe 36, thereby bringing the latter into communication through a pipe 39 with the opposite end of the air motor. The valve stem is actuated co-operatively by a spring 40 within the valve housing and by a cam 41 on a continuously rotating drive shaft 42. The cam, as shown, is made in sections relatively adjustable which are held in position by a clamping bolt 43, whereby the relative timing of the opposite movements of the air motor may be adjusted.

It will be seen that as the cam 41 rotates, air pressure will be supplied alternately to opposite ends of the motor 32, thereby causing it to drive the pinion 27 alternately in opposite directions, whereby the cutter carrying plate 19 is oscillated. As the plate 19 oscillates, a reciprocating movement is imparted to the cutters by means of stationary spiral cam tracks 44 in which run rolls 45 carried by the respective knife blocks 17. The spiral cam tracks thus cause the cutters to advance in a radial direction as they are revolved with the plate 19. The resultant of these two movements is a spiral movement by which the blades are caused to penetrate spirally into the column of glass.

Referring to Figure 5, the position of the cutting edge of a blade at successive short intervals during the cutting operation is indicated diagrammatically by the series of curved lines 46. When the blade commences its cut it is in the position indicated by the line *a*. As the blade advances, its angular position is gradually changed, so that at the completion of the cutting stroke it is in the position *b*. The spiral movement of the blades as just described, avoids the tendency present with the usual forms of reciprocating cutters, to flatten the glass and deform it and throw it out of its normal line of movement.

Modifications may be resorted to within the spirit and scope of our invention.

What we claim is:

1. In cutting apparatus, the combination of a pair of cutter blades, a carrier on which they are mounted, means to oscillate said carrier, and means to move the blades radially inward relative to the center of said oscillation during the oscillation of the carrier in one direction and to withdraw the blades during the reverse movement of the carrier.

2. The combination with means to flow glass, of a rotary carrier having its axis of rotation in the line of flow, a pair of cutter blades mounted thereon with their cutting edges at opposite sides of said axis of rotation, and means to rotate the carrier and simultaneously advance the cutters radially.

3. The combination with means to flow glass, of cutting mechanism comprising in combination a rotary support, cutters mounted on said support and having V-shaped cutting edges at opposite sides of the flow and of the center of said support, means to move said cutters radially toward said center and cause their edges to overlap and operate with a shearing cut, and means to rotate said support as the cutters advance.

4. The combination with means to flow glass, of cutting apparatus comprising in combination a pair of cutter blades having V-shaped cutting edges, and means to simultaneously oscillate said blades about a common axis and reciprocate them toward and from said axis.

5. The combination of a rotary carrier, cutters mounted thereon, means to rotate said carrier, and stationary cams operable to reciprocate the cutters on said carrier as the latter rotates.

6. The combination of a rotary carrier, cutters mounted thereon to reciprocate toward and from the axis of rotation of the carrier, means to rotate the carrier, and stationary spiral cams to reciprocate the cutters.

7. The combination of a rotary carrier, cutters mounted thereon to reciprocate toward and from the axis of rotation of the carrier, means to rotate the carrier, said means comprising a reciprocating piston motor, a pinion driven thereby, a stationary arc-shaped rack on which the pinion runs, and a rack connected to said carrier and driven by said pinion, and stationary spiral cams to reciprocate the cutters.

8. The combination of means to produce a flow of molten glass, a knife blade to sever the glass, and means to advance said blade spirally.

9. The combination of means to produce a flow of molten glass, a knife blade to sever the glass, and means to advance the knife blade spirally in a plane perpendicular to the direction of movement of the glass.

10. The combination with means to flow molten glass, of a mechanical shear, and means to impart a spiral cutting movement to said shear in a plane transverse to the glass.

11. The combination with means to flow a stream or column of molten glass, of cutting mechanism comprising cutters at opposite sides of the glass, and means to advance said cutters in spiral paths and thereby sever the glass.

12. The combination of a container for molten glass having an outlet orifice in the bottom thereof through which the glass issues, cutting mechanism comprising shear blades located beneath said orifice at opposite sides of the issuing glass, and means to advance said blades in spiral paths and thereby sever the issuing glass.

13. The combination of a container for molten glass having an outlet orifice in the bottom thereof through which the glass issues, cutting mechanism comprising shear blades located beneath said orifice at opposite sides of the issuing glass, and means to advance said blades in spiral paths and thereby sever the issuing glass, said blades having V-shaped cutting edges, the outer portions of which overlap as the blades approach so that the cutting edges surround the issuing glass during the cutting operation.

14. The method which consists in causing molten glass to issue from an outlet orifice in the bottom of a container, and periodically severing the glass by mechanical cutting means moving spirally in a plane perpendicular to the movement of the glass.

15. The method which consists in causing molten glass to issue from an outlet orifice in the bottom of a container, and periodically severing the glass by surrounding the same with mechanical cutters and causing their cutting edges to move spirally inward in a horizontal plane.

Signed at Toledo, in the county of Lucas and State of Ohio, this 7th day of September, 1921.

ENOCH T. FERNGREN.
LEONARD D. SOUBIER.